United States Patent
Choi et al.

(10) Patent No.: US 10,164,333 B2
(45) Date of Patent: Dec. 25, 2018

(54) SHORT-RANGE MAGNETIC FIELD SYSTEM

(71) Applicant: Daegu Gyeongbuk Institute of Science and Technology, Daegu (KR)

(72) Inventors: Ji Woong Choi, Daegu (KR); Jae Eun Jang, Daegu (KR); Han Joon Kim, Gyeonggi-do (KR); Jin Ho Park, Seoul (KR); Kyoung Sub Oh, Gyeonggi-do (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 35 days.

(21) Appl. No.: 15/311,415

(22) PCT Filed: Mar. 16, 2015

(86) PCT No.: PCT/KR2015/002491
§ 371 (c)(1),
(2) Date: Nov. 15, 2016

(87) PCT Pub. No.: WO2015/182858
PCT Pub. Date: Dec. 3, 2015

(65) Prior Publication Data
US 2017/0084992 A1    Mar. 23, 2017

(30) Foreign Application Priority Data
May 27, 2014  (KR) .................. 10-2014-0063783

(51) Int. Cl.
*H01Q 1/52*    (2006.01)
*H01Q 1/22*    (2006.01)
(Continued)

(52) U.S. Cl.
CPC .......... *H01Q 1/526* (2013.01); *H01Q 1/2291* (2013.01); *H01Q 1/243* (2013.01); *H01Q 7/00* (2013.01);
(Continued)

(58) Field of Classification Search
CPC ........ H01Q 1/526; H01Q 7/00; H01Q 1/2291; H01Q 1/243; H04B 5/0031; H04B 5/0037; H04B 5/0087
See application file for complete search history.

(56) References Cited

U.S. PATENT DOCUMENTS

2012/0086556 A1* 4/2012 Ikemoto .................. H01Q 7/00
340/10.1

FOREIGN PATENT DOCUMENTS

| JP | 2004-260319 A | 9/2004 |
|---|---|---|
| JP | 2011-003960 A | 1/2011 |

(Continued)

OTHER PUBLICATIONS

Int'l Search Report dated May 21, 2015 in Int'l Application No. PCT/KR2015/002491.
(Continued)

*Primary Examiner* — Jessica Han
*Assistant Examiner* — Michael M Bouizza
(74) *Attorney, Agent, or Firm* — Panitch Schwarze Belisario & Nadel LLP

(57) ABSTRACT

A short-range magnetic field system according to an embodiment includes a transmission antenna part located at a transmission port; and a reception antenna part located at a reception port to face the transmission antenna part. wherein a magnetic field formed around the transmission antenna part or the reception antenna part can be offset.

11 Claims, 11 Drawing Sheets

(51) Int. Cl.
*H01Q 1/24* (2006.01)
*H01Q 7/00* (2006.01)
*H04B 5/00* (2006.01)

(52) U.S. Cl.
CPC ......... *H04B 5/0031* (2013.01); *H04B 5/0037* (2013.01); *H04B 5/0087* (2013.01)

(56) References Cited

FOREIGN PATENT DOCUMENTS

| KR | 10-0605341 B1 | 7/2006 |
| KR | 10-1226559 B1 | 1/2013 |
| KR | 2013-0130160 A | 12/2013 |

OTHER PUBLICATIONS

Int'l Written Opinion dated May 21, 2015 in Int'l Application No. PCT/KR2015/002491.

\* cited by examiner

10

100

10

SHORT-RANGE MAGNETIC FIELD SYSTEM

CROSS-REFERENCE TO RELATED APPLICATION

This application is a Section 371 of International Application No. PCT/KR2015/002491, filed Mar. 16, 2015, which was published in the Korean language on Dec. 3, 2015, under International Publication No. WO 2015/182858 A1, and the disclosure of which is incorporated herein by reference.

TECHNICAL FIELD

The present invention relates to a short-range magnetic field system, and more particularly, to a short-range magnetic field system for disposing heterogeneous antennas to offset a magnetic field formed around a transmission antenna array or a reception antenna array.

BACKGROUND ART

A short-range magnetic field system is associated with short-range wireless contact standards including Erma 340 and ISO/IEC 18092 that use magnetic induction between neighboring devices to establish communication in all directions.

For example, the short-range magnetic field system may transmit data at a data rate up to 424 kilobits per second (Kbps) within a range of 20 centimeters (cm) using a frequency of 13.56 megahertz (MHz), and may be used to make a payment and to download content to a mobile device such as a cellular phone and through a wireless broadband internet (WiBro).

Magnetic field communication technology is a wireless communication system technology using magnetic induction that enables wireless communication even in extreme environments, for example, in an environment in which metals are used, an underwater environment, an underground environment, and a collapsed or destroyed building.

Because the magnetic field communication technology uses a low frequency unlike recent high frequency communication technology, a degree of penetration may be relatively high. Thus, the magnetic field communication technology uses a principle that a frequency loss may be less even when a frequency passes through different mediums such as soil, water, and concrete.

Similarly, the magnetic field communication technology may have a communication range wider than that of near field communication (NFC) technology and radio frequency identification (RFID) technology and consume a small amount of power. Thus, the magnetic field communication technology is suitable for establishing a sensor network for monitoring management of the underground environment, the underwater environment, and a harmful environment.

For example, when an underground facility is managed using magnetic communication, an amount of damage caused by a leakage from water mains may be reduced by more than 20%.

In addition, the short-range magnetic field system may be applied to a wireless power transfer (WPT) method, also referred to as a wireless energy transfer method or a wireless charge method, in an electronic device, and the WPT method may have a great number of advantages.

Firstly, in terms of convenience, a user may not need to unnecessarily carry a plurality of cable chargers in order to charge batteries of devices such as mobile phones, tablet computers, and notebook computers. Instead, the user may dispose a single wireless charger in an area such as a conference room, a coffee shop, a waiting area at an airport, and a house. The user may charge electronic devices by simply disposing the wireless charger close to the electronic devices without using a wired connection. A WPT system may be standardized such that a plurality of devices of which models and producers are different are charged by a single wireless charger. Thus, a universal charging standard may be possible.

Secondly, in terms of practicality, as number of physical electrical outlets to be used in the area such as the conference room the coffee shop, and the waiting area at the airport may be limited. Thus, a number of users who are able to use the electrical outlets may be also limited. However, the WPT system ma solve such problems and enable the users to charge the devices in a faster and easier manner.

Thirdly, in terms of penetrability, a wireless power may penetrate through various objects such as a tree, plastic, paper, and fabric. Thus, a power may be transferrable even in places where a physical wired connection is unadvisable or impossible, for example, where an implant apparatus is used, in the underwater environment, or where a charging is performed while moving.

Fourthly, in terms of greening, the WPT system follows a universal charging solution (UCS) suggested by all international telecommunication union (ITU) which is a specialized agency of the United Nations. Essentially the UCS may allow all handsets to be charged with a same wireless charger such that an amount of standby energy consumption will be reduced 50 percent, 51,000 tons of surplus chargers will be removed, and 13.6 million tons of greenhouse gas emissions will be reduced every year.

Accordingly, a variety of research is being done on the short-range magnetic field system and the WPT method.

For example, Korean Patent Laid-Open Publication No. 2012-0019195 published on Feb. 24, 2012 discloses an apparatus for transmitting magnetic resonance power.

DISCLOSURE OF INVENTION

Technical Goals

An aspect of the present invention provides a short-range magnetic field system for offsetting a magnetic field formed between a transmission antenna array and a reception antenna array by disposing a heterogeneous antenna in a multiple-input and multiple-output (MIMO) system, and separating a signal between a pair of a transmission antenna and a reception antenna from a signal between another pair of a transmission antenna and as reception antenna.

Another aspect of the present invention provides a short-range magnetic field system for transmitting a plurality of signals transmitted in series from a transmission antenna array and receiving a plurality of signals incoherently received by a reception antenna array.

Still another aspect of the present invention provides a short-range magnetic field system that enables reliable communication and power transmission using an identical frequency based on a MIMO structure, thereby enhancing a data transmitting rate and a data reliability.

Yet another aspect of the present invention provides a short-range magnetic field system that reduces a complexity of a system because a transmission signal is separated from a reception signal and a channel estimation required for a related electromagnetic wave based MIMO system is unnecessary.

A further aspect of the present invention provides a short-range magnetic field system that is applicable to underwater communication, underground communication, and a human implantable apparatus because the short-range magnetic field system is uninfluenced by permittivity of a medium.

Another aspect of the present invention provides a short-range magnetic field system that is applicable to short-range communication and military applications that require security because electromagnetic wave jamming or signal wiretapping is impossible.

Another aspect of the present invention provides a short-range magnetic field system that is applicable to a wireless power transmitting for transportation because communication and wireless power transmission are simultaneously performed such that information required for transportation, for example, information on roads, may be transmitted in real time.

Technical Solutions

According to an aspect of the present invention, there is provided a short-range magnetic field system, the system including a transmission antenna array disposed on a transmission end, and a reception antenna array disposed on as reception end such that the reception antenna array faces the transmission antenna array, wherein a magnetic field formed around the transmission antenna array or the reception antenna array is offsettable.

A signal transmitted from the transmission antenna array may be incoherently received by the reception antenna array.

The transmission antenna array and the reception antenna array may include a plurality of transmission antennas and a plurality of reception antennas, respectively.

The transmission antennas or the reception antennas may include heterogeneous antennas each having an effect of offsetting a magnetic field, and the heterogeneous antennas may include a circular antenna or a multipolar antenna.

The multipolar antenna may include a quadrupole antenna, and the quadrupole antenna may include a homogeneous quadrupole antenna having two loops identical in diameter and a heterogeneous quadrupole antenna having two loops different in diameter.

The two loops of the heterogeneous quadrupole antenna may be disposed in a vertical direction of the two loops of the homogeneous quadrupole antenna.

The transmission antennas or the reception antennas may include the homogeneous quadrupole antenna and the heterogeneous quadrupole antenna, and a diameter of a near loop of the heterogeneous quadrupole antenna relative to the homogeneous quadrupole antenna is less than a diameter of a distant loop of the heterogeneous quadrupole antenna relative to the homogeneous quadrupole antenna.

The multipolar antenna may further include an octupole antenna, and the octupole antenna has a plurality of loops identical in diameter.

The circular antenna or the multipolar antenna may have a coil, and a number of turns of the coil may be adjustable.

Centers of the transmission antennas or centers of the reception antennas may be disposed on an identical line, and the transmission antennas or the reception antennas may be symmetrically disposed relative to the identical line.

The transmission antennas or the reception antennas may be disposed to be spaced apart from each other in parallel.

Effects

According to an aspect of the present invention, it is possible that a short-range magnetic field system may offset a magnetic field formed between a transmission antenna array and a reception antenna array by disposing a heterogeneous antenna in a multiple-input and multiple-output (MIMO) system, and separate a signal between a pair of a transmission antenna and a reception antenna from a signal between another pair of a transmission antenna and a reception antenna.

According to an aspect of the present invention, it is possible that a short-range magnetic field system may transmit a plurality of signals transmitted in series from a transmission antenna array and receive a plurality of signals incoherently received by a reception antenna array.

According to an aspect of the present invention, it is possible that a short-range magnetic field system may enable reliable communication and power transmission using an identical frequency based on a MIMO structure, thereby enhancing a data transmitting rate and a data reliability.

According to an aspect of the present invention, it is possible that as short-range magnetic field system may reduce a complexity of a system because a transmission signal is separated from a reception signal and a channel estimation required for a related electromagnetic wave based MIMO system is unnecessary.

According to an aspect of the present invention, it is possible that a short-range magnetic field system may be applicable to underwater communication, underground communication, and a human implantable apparatus because the short-range magnetic field system is uninfluenced by permittivity of a medium.

According to an aspect of the present invention, it is possible that a short-range magnetic field system may be applicable to short-range communication and military applications that require security because electromagnetic wave jamming or signal wiretapping is impossible.

According to an aspect of the present invention, it is possible that a short-range magnetic field system may be applicable to a wireless power transmitting for transportation because communication and wireless power transmission are simultaneously performed such that information required for transportation, for example, information on roads, may be transmitted in real time.

BEST MODE FOR CARRYING OUT THE INVENTION

Figure 1:
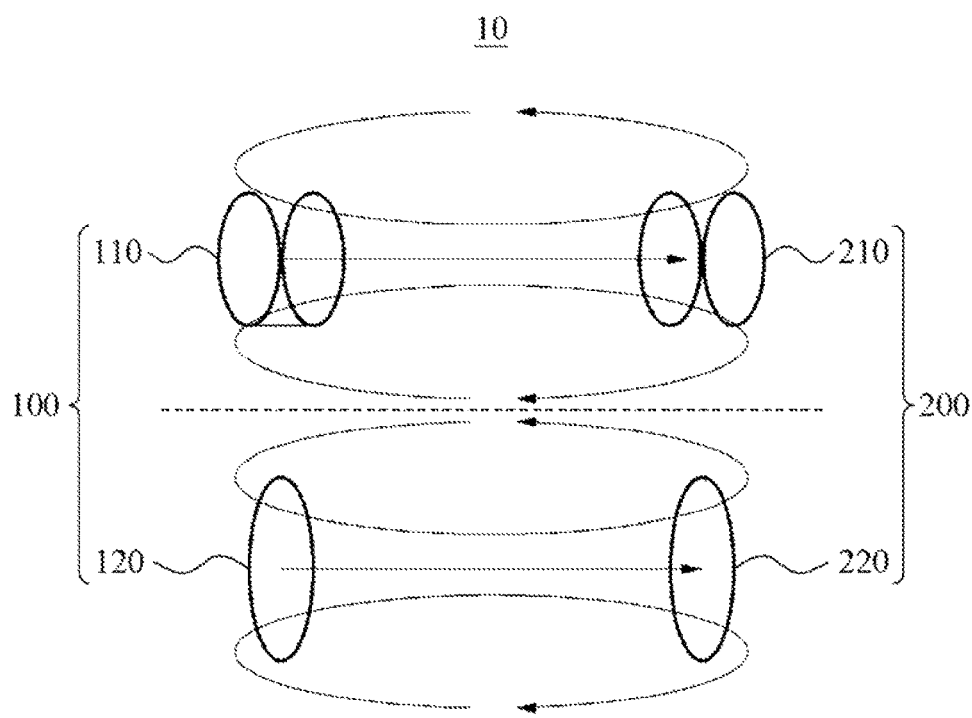
FIG. 1 is a diagram illustrating a short-range magnetic field system according to an embodiment.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
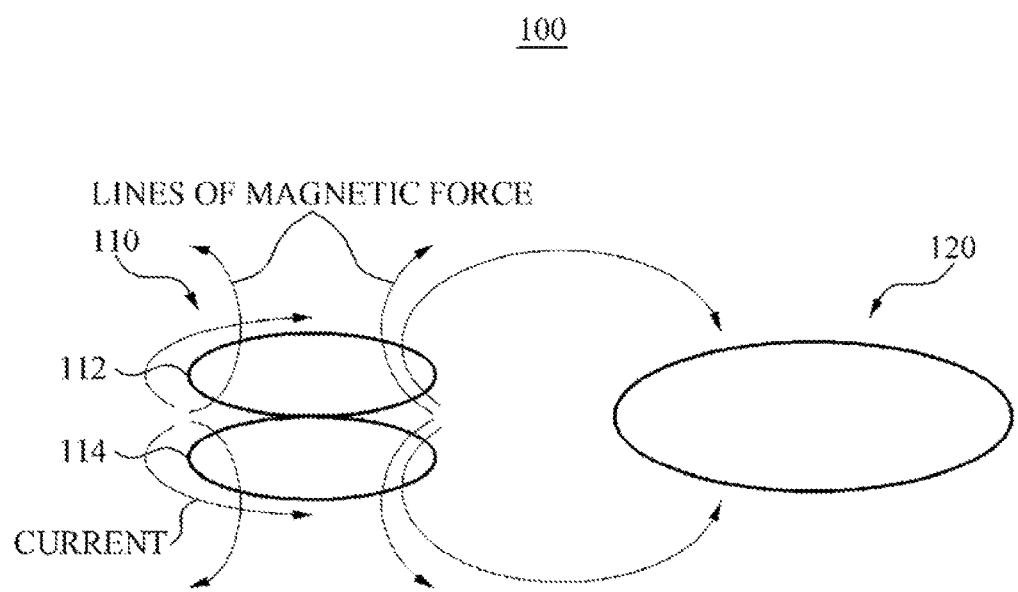
FIG. 2 is a diagram illustrating a quadrupole antenna included in a short-range magnetic field system according to an embodiment.

FIG. 1 is a diagram illustrating a short-range magnetic field system according to an embodiment, and FIG. 2 is a diagram illustrating a quadrupole antenna included in a short-range magnetic field system according to an embodiment.

Referring to FIG. 1, a short-range magnetic field system 10 includes a transmission antenna array 100 and a reception antenna array 200.

The transmission antenna array 100 may be disposed on a transmission end (not shown).

In addition, the transmission antenna array 100 may include a plurality of transmission antennas.

For example, the transmission antennas include a first transmission antenna 110 and a second transmission antenna 120 disposed to be spaced apart from the first transmission antenna 110.

In detail, the first transmission antenna 110 and the second transmission antenna 120 may be vertically disposed to be spaced apart from each other.

Here, the first transmission antenna 110 and the second transmission antenna 120 may be heterogeneous antennas each having an effect of offsetting a magnetic field, and the heterogeneous antennas may include a circular antenna or a multipolar antenna.

Here, the multipolar antenna may include a quadrupole antenna or an octupole antenna.

Also, the quadrupole antenna may include a homogeneous quadrupole antenna having two loops identical in diameter and a heterogeneous quadrupole antenna having two loops different in diameter.

For example, the first transmission antenna 110 may be provided as the quadrupole antenna and the second transmission antenna 120 may be provided as the circular antenna.

Alternatively, the first transmission antenna 110 may be provided as the circular antenna and the second transmission antenna 120 may be provided as the quadrupole antenna.

The reception antenna array 200 may be disposed on a reception end (not shown).

Also, the reception antenna array 201 may include a plurality of reception antennas.

For example, the reception antennas may include a first reception antenna 210 and a second reception antenna 220.

In detail, the first reception antenna 210 may be disposed to face the first transmission antenna 110, and the second reception antenna 220 may be disposed to face the second transmission antenna 120.

Here, the first reception antenna 210 and the second reception antenna 220 may have different forms. For example, the first reception antenna 210 may be provided as the quadrupole antenna and the second reception antenna 220 may be provided as the circular antenna.

Alternatively, the first reception antenna 210 may be provided as the circular antenna and the second reception antenna 220 may be provided as the quadrupole antenna.

Also, a distance between the first transmission antenna 110 and the second transmission antenna 120 may be identical to a distance between the first reception antenna 210 and the second reception antenna 220.

A distance between the first transmission antenna 110 and the first reception antenna 210 may be identical to a distance between the second transmission antenna 120 and the second reception antenna 220.

Thus, a multiple-input and multiple-output (MIMO) may be possible due to the transmission antenna array 100 and the reception antenna array 200, and a plurality of signals may be simultaneously transmitted to the reception antenna array 200 from the transmission antenna array 100.

In particular, the transmission antenna array 100 or the reception antenna array 200 may be provided as the heterogeneous antennas and thus, a signal transmitted from the transmission antenna array 100 is incoherently received by the reception antenna array 200.

In detail, sizes of lines of magnetic force formed in each internal circular antenna of the first transmission antenna 110 and the first reception antenna 210 may be identical, but directions of the lines of magnetic force may be opposite.

Thus, a magnetic field formed between the first transmission antenna 110 and the second transmission antenna 120 and a magnetic field formed between the first reception antenna 210 and the second reception antenna 220 may be offset. A signal between the first transmission antenna 110 and the first reception antenna 210 may be separated from a signal between the second transmission antenna 120 and the second reception antenna 220.

Thus, the signal transmitted from the first transmission antenna 110 may be received by the first reception antenna 210 in series, and the signal transmitted from the second transmission antenna 120 may be received by the second reception antenna 220 in series.

Referring to FIG. 2, when the first transmission antenna 110 is provided as the quadrupole antenna and the second transmission antenna 120 is provided as the circular antenna in the transmission antenna array 100, an effect of offsetting may occur as follows.

The quadrupole antenna may be provided as the homogeneous quadrupole antenna, and may include a first portion 112 and a second portion 114 having loops identical in diameter.

Here, currents of which sizes are identical and directions are opposite may flow to the first portion 112 and the second portion 114, such that the lines of magnetic force of which sizes are identical and directions are opposite may be formed between the first portion 112 and the second portion 114.

The lines of magnetic force may be symmetrically formed on the right and the left of each of the first portion 112 and the second portion 114. The lines of magnetic force formed on the first portion 112 may be formed symmetrical to the lines of magnetic force formed on the second portion 114.

Accordingly, the magnetic field formed around the homogeneous quadrupole antenna may be offset.

Also, the magnetic field formed between the first transmission antenna 110 and the second transmission antenna 120 may be offset.

In detail, the size of the line of magnetic force formed between the first portion 112 of the homogeneous quadrupole antenna and the circular antenna is identical to the size of the line of magnetic force formed between the second portion 114 of the homogeneous quadrupole antenna and the circular antenna, while the directions of the lines of magnetic force are opposite. Thus, the line of magnetic force formed between the first portion 112 of the homogeneous quadrupole antenna and the circular antenna may be formed symmetrical to the line of magnetic force formed between the second portion 114 of the homogeneous quadrupole antenna and the circular antenna.

Thus, when the first transmission antenna 110 is provided as the homogeneous quadrupole antenna and the second transmission antenna 120 is provided as the circular antenna, the magnetic field formed between the first transmission antenna 110 and the second transmission antenna 120 may be offset.

FIG. 2 illustrates the effect of offsetting the magnetic field formed between the first transmission antenna 110 and the second transmission antenna 120, and it is obvious that the same effect of offsetting the magnetic field formed between the first reception antenna 210 and the second reception antenna 220 is also obtainable.

Figure 3A:
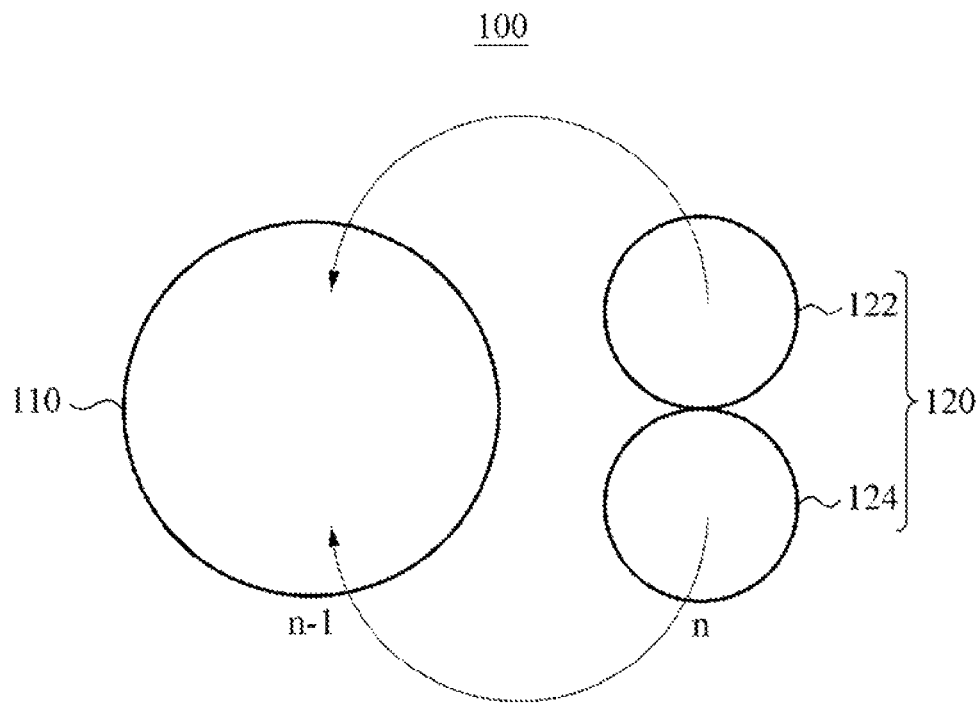
FIGS. 3A and 3B are diagrams illustrating unidirectional offset structures of a short-range magnetic field system according to an embodiment.
Figure 3B:
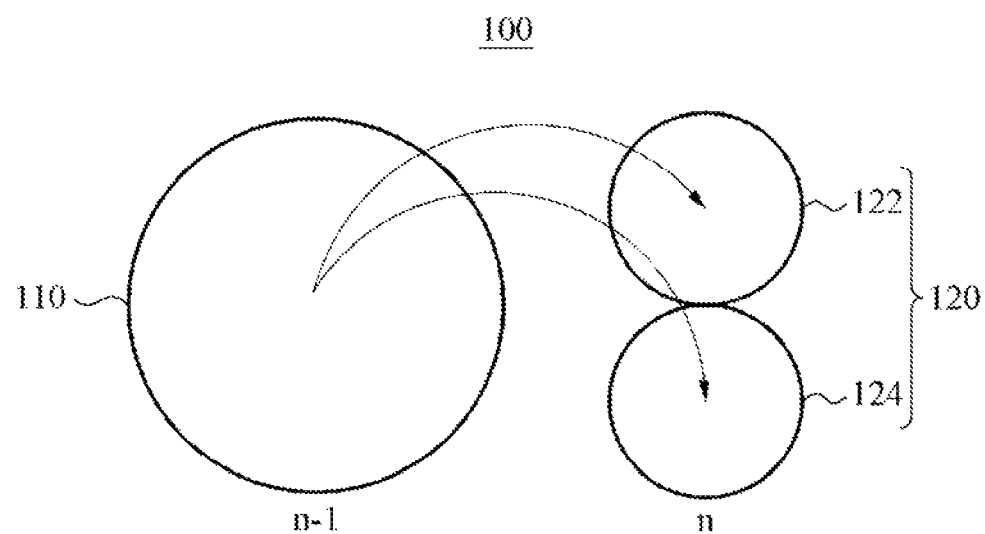
Figure 4A:
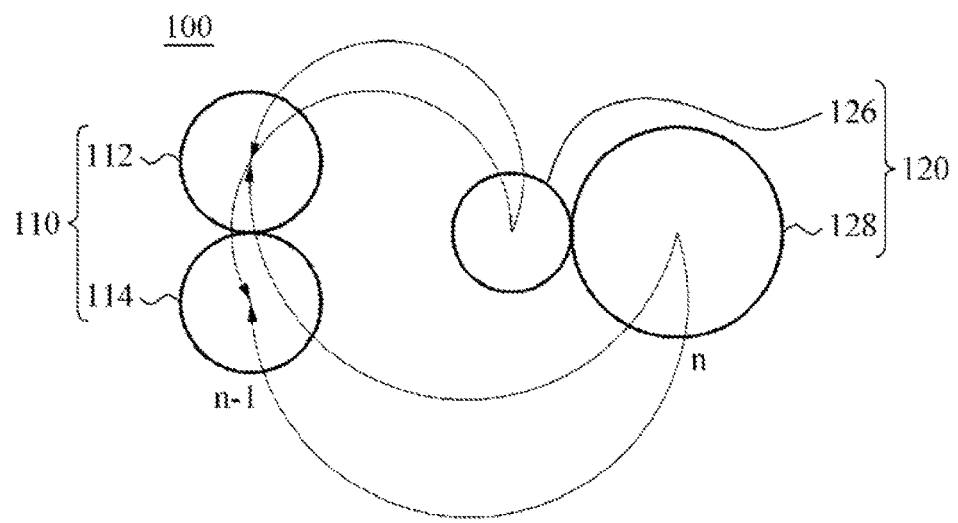
FIGS. 4A through 4C are diagrams illustrating mutual offset structures of a short-range magnetic field system according to an embodiment.
Figure 4B:
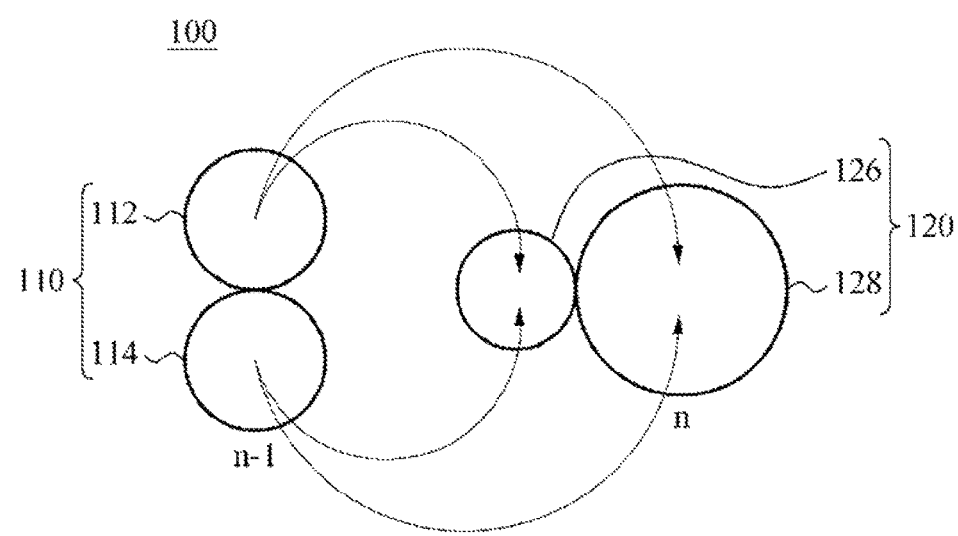
Figure 4C:
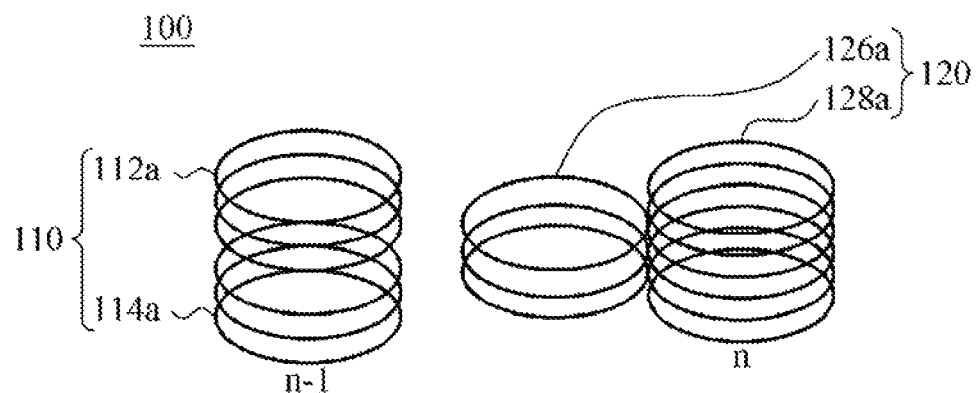

FIGS. 3A and 3B are diagrams illustrating a unidirectional offset structure of a short-range magnetic field system according to an embodiment, and FIGS. 4A through 4C are diagrams illustrating a mutual offset structure of a short-range magnetic field system according to an embodiment.

The offset structure of the short-range magnetic field system may vary.

Hereinafter, the offset structure of the magnetic field formed between the first transmission antenna 110 and the second transmission antenna 120 is explained as an example.

However, the offset structure is not limited thereto, and the offset structure of the short-range magnetic field system may be identically applied to the magnetic field formed between the first reception antenna 210 and the second reception antenna 220.

Referring to FIGS. 3A and 3B, the offset structure of the short-range magnetic field system may be unidirectional.

Referring to FIG. 3A, the first transmission antenna 110 is provided as the circular antenna and the second transmission antenna is provided as the homogeneous quadrupole antenna.

Here, a first portion 122 and a second portion 124 are vertically disposed in the second transmission antenna 120, and diameters of the first portion 122 and the second portion 124 may be identical. The diameter of the first transmission antenna 110 may be greater than the diameters of the first portion 122 and the second portion 124.

The line of magnetic force may be formed toward the first transmission antenna 110 from the first portion 122 of the second transmission antenna 120, and the line of magnetic force may be formed toward the first transmission antenna 110 from the second portion 124 of the second transmission antenna 120.

Because the sizes of the lines of magnetic three formed from the first portion 122 of the second transmission antenna 120 and the second portion 124 of the second transmission antenna 120 are identical and the directions of the lines of magnetic force are opposite, the magnetic field formed between the first transmission antenna 110 and the second transmission antenna 120 may be offset.

Referring to FIG. 3B, the line of magnetic force may be formed toward the first portion 122 of the second transmission antenna 120 from the first transmission antenna 110, and the line of magnetic three may be formed toward the second portion 124 of the second transmission antenna 120 from the first transmission antenna 110.

The sizes and the directions of the lines of magnetic force formed from the first transmission antenna 110 may be identical.

Thus, because the lines of magnetic force formed between the first transmission antenna 110 and the second transmission antenna 120 are unidirectional, the effect of offsetting may be insufficient.

However, each of signals may be incoherently transmitted because a signal transmitted, from the first transmission antenna 110 is uninfluenced by a signal transmitted from the second transmission antenna 120.

Also, the signal transmitted from the first transmission antenna 110 and the signal transmitted from the second transmission antenna 120 may be separated from each other due to the effect of offsetting the magnetic field.

Referring to FIGS. 4A through 4C, the offset structure of the short-range magnetic field system may be mutual.

Referring to FIG. 4A, the first transmission antenna 110 is provided as the quadrupole antenna and the first reception antenna 120 is provided as the quadrupole antenna.

Here, the first portion 112 and the second portion 114 are disposed in the first transmission antenna 110, and the first transmission antenna 110 may be provided as a homogeneous quadrupole antenna having loops identical in diameter.

Alternatively, a first portion 126 and a second portion 128 are horizontally disposed in the second transmission antenna 120, and the second transmission antenna 120 may be provided as a heterogeneous quadrupole antenna having loops different in diameter.

Here, in the second transmission antenna 120, the first portion 126 may be closer to the first transmission antenna 110 than the second portion 128. Thus a distance between the first transmission antenna 110 and the first portion 126 may be different from a distance between the first transmission antenna 110 and the second portion 128 of the second transmission antenna 120. An effect caused by a difference between the distances may be offset by adjusting diameters of the first portion 126 and the second portion 128 of the second transmission antenna 120.

For example, the first portion 112 and the second portion 114 of the first transmission antenna 110 may be identical, the first portion 126 of the second transmission antenna 120 may be smaller than the first portion 112 or the second portion 114 of the first transmission antenna 110, and the second portion 126 of the second transmission antenna 120 may be larger than the first portion 112 or the second portion 114 of the first transmission antenna 110 and the first portion 124 of the second transmission antenna 120.

Thus, the first portion 126 of the second transmission antenna 120 may be disposed relatively close to the first transmission antenna 110 and thus, the diameter of the first portion 126 may be relatively small. When the second portion 128 of the second transmission antenna 120 is disposed relatively far from the first transmission antenna 110 and the diameter of the second portion 128 of the second transmission antenna 120 is relatively large, the effect of offsetting the magnetic field formed between the first transmission antenna 110 and the second transmission antenna 120 may be obtained.

The line of magnetic force may be formed toward the first portion 112 of the first transmission antenna 110 from the first portion 126 of the second transmission antenna 120, and the line of magnetic force may be formed toward the second portion 114 of the first transmission antenna 110 from the first portion 126 of the second transmission antenna 120.

The sizes and the directions of the lines of magnetic force formed from the first portion 126 of the second transmission antenna 120 may be identical.

In addition, the line of magnetic force may be formed toward the first portion 112 of the first transmission antenna 110 from the second portion 128 of the second transmission antenna 120, and the line of magnetic force may be formed toward the second portion 114 of the first transmission antenna 110 from the second portion 128 of the second transmission antenna 120.

The sizes and the directions of the lines of magnetic force formed from the second portion 128 of the second transmission antenna 120 may be identical.

The size and the direction of line of magnetic force formed from the first portion 126 of the second transmission antenna 120 may be identical to the size and the direction of the line of magnetic force formed from the second portion 128 of the second transmission antenna 120 in the first portion 112 and the second portion 114 of the first transmission antenna 110.

Thus, the magnetic field formed between the first transmission antenna 110 and the second transmission antenna 120 may be offset.

Referring to FIG. 4B, the line of magnetic force may be formed toward the first portion 126 of the second transmission antenna 120 front the first portion 112 of the first transmission antenna 110, and the line of magnetic force may be formed toward the first portion 126 of the second transmission antenna 120 from the second portion 114 of the first transmission antenna 110.

The sizes of the lines of magnetic force formed toward the first portion 126 of the second transmission antenna 120 from the first portion 112 and the second portion 114 of the first transmission antenna 110 may be identical while the directions of the lines of magnetic three are opposite.

Also, the line of magnetic force may be formed toward the second portion 128 of the second transmission antenna 120 from the first portion 112 of the first transmission antenna 110, and the line of magnetic force may be formed toward the second portion 128 of the second transmission antenna 120 from the second portion 114 of the first transmission antenna 110.

The sizes of the lines of magnetic force formed toward the second portion 128 of the second transmission antenna 120 from the first portion 112 and the second portion 114 of the first transmission antenna 110 may be identical while the directions of the lines of magnetic force are opposite.

Thus, the magnetic field formed between the first transmission antenna 110 and the second transmission antenna 120 may be offset.

Accordingly, a signal transmitted from the first transmission antenna 110 and a signal transmitted from the second transmission antenna 120 may be incoherently transmitted.

The signal transmitted from the first transmission antenna 110 and the signal transmitted from the second transmission antenna 120 may be separated from each other due to the effect of offsetting the magnetic field.

Further, referring to FIG. 4C, the first transmission antenna 110 may have coils 112a and 114a each having identical numbers of turns and identical diameters, and the second transmission antenna 120 may have coils 116a and 118a each having different numbers of turns and identical diameters.

Here, the diameters of the first portion 112a and the second portion 114a of the first transmission antenna 110 may be identical to the diameters of the first portion 126a of the second transmission antenna 120. In the second transmission antenna 120, the first portion 126a may be disposed relatively closer to the first transmission antenna 110 than the second portion 128a.

The number of turns of each of the first portion 112a and the second portion 114a of the first transmission antenna 110 may be identical to the number of turns of the first portion 126a of the second transmission antenna 120. The number of turns of the second portion 128a of the second transmission antenna 120 may be greater than the number of turns of the first portion 126a. For example, the number of turns of the first portion 126a may be 3, and the number of turns of the second portion 128a may be 6.

When the number of turns of the first portion 126a of the second transmission antenna 120 is different trout the number of turns of the second portion 128a, the effect of offsetting the magnetic field formed between the first transmission antenna 110 and the second transmission antenna 120 may be obtainable.

Although FIG. 4C illustrates examples in which the homogeneous quadrupole antenna and the heterogeneous quadrupole antenna have coils, the circular antenna or the multipolar antenna may also have coils.

Figure 5A:
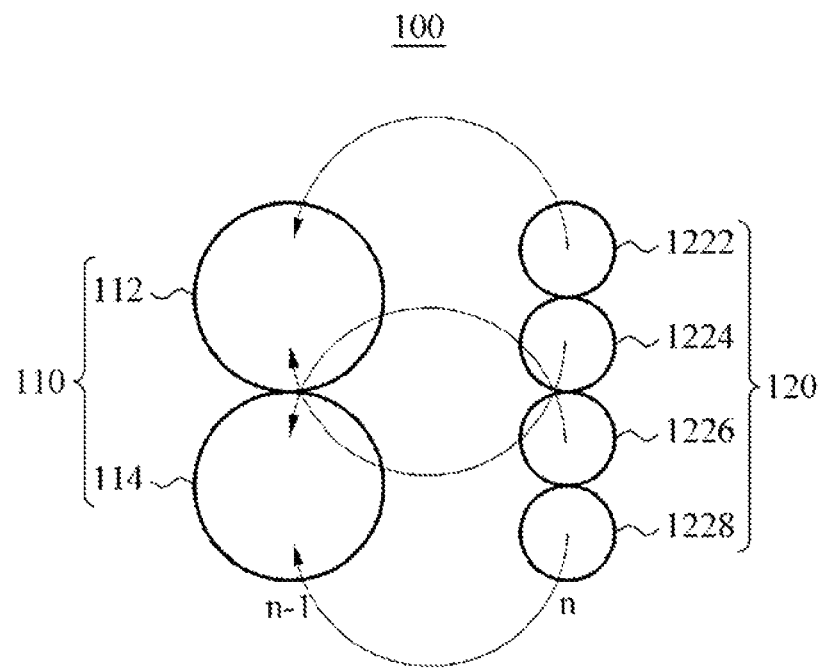
FIGS. 5A and 5B are diagrams illustrating complex offset structures of a short-range magnetic field system according to an embodiment.
Figure 5B:
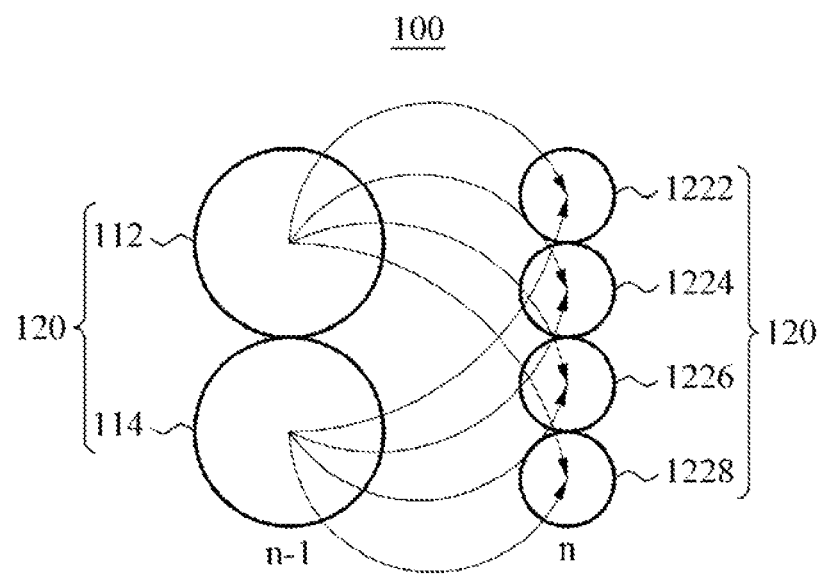

In addition, referring to FIGS. 5A and 5B, the offset structure of the short-range magnetic field system may be complex.

The first transmission antenna 110 is provided as the quadrupole antenna, and the second transmission antenna 120 is provided as the multipolar antenna, in particular, as an octupole antenna.

Here, the first portion 112 and the second portion 114 of the second transmission antenna 120 are vertically disposed, and the diameters of the first portion 112 and the second potion 114 are identical.

A first portion 1222, a second portion 1224, a third portion 1226, and a fourth portion 1228 of the second transmission antenna 120 are vertically disposed, and diameters of the first portion 1222, the second portion 1224, the third portion 1226, and the fourth portion 1228 are identical.

A line of magnetic force is formed toward the first portion 112 of the first transmission antenna 110 from the first portion 1222 of the second transmission antenna 120, and a line of magnetic force is formed toward the first portion 122 of the first transmission antenna 110 from the second portion 1224 of the second transmission antenna 120.

Sizes of the lines of magnetic force formed from the first portion 1222 and the second portion 1224 of the second transmission antenna 120 may be identical, but directions of the lines of magnetic force may be opposite.

A line of magnetic force is formed toward the second portion 114 of the first transmission antenna 110 from the third portion 1226 of the second transmission antenna 120, and a line of magnetic force is formed toward the second portion 114 of the first transmission antenna 110 from the fourth portion 1228 of the second transmission antenna 120.

Sizes of the lines of magnetic force formed horn the third portion 1226 and the fourth portion 1228 of the second transmission antenna 120 may be identical, but directions of the lines of magnetic force may be opposite.

Thus, the magnetic field formed between the first transmission antenna 110 and the second transmission antenna 120 may be offset.

Referring to FIG. 5B, the lines of magnetic force are formed toward each of the first portion 1222, the second portion 1224, the third portion 1226 and the fourth portion 1228 of the second transmission antenna 120 from the first portion 112 of the first transmission antenna 110, and the lines of magnetic force are formed toward each of the first portion 1222, the second portion 1224, the third portion 1226, and the fourth portion 1228 of the second transmission antenna 120 from the second portion 114 of the first transmission antenna 110.

Here, sizes of the lines of magnetic force formed from the first portion 112 and the second portion 114 of the first transmission antenna 110 may be identical, but directions of the lines of magnetic force may be opposite.

However, as illustrated in FIG. 5B, distances between each end of the lines of magnetic force formed toward the second transmission antenna 120 from the first transmission antenna 110 may be predetermined to be different and thus, the effect of offsetting may be imperfect.

Thus, a portion in which the magnetic field is offset and a portion in which the magnetic field is not offset may be complexly formed between the first transmission antenna 110 and the second transmission antenna 120.

Based on the complex offset structure, the signal transmitted from the first transmission antenna 110 and the signal transmitted from the second transmission antenna 120 may be incoherently transmitted.

Also, based on the complex offset structure, the signal transmitted from the first transmission antenna 110 may be separated from the signal transmitted from the second transmission antenna 120.

As illustrated in FIGS. 3 through 5, the short-range magnetic field system ma provide various heterogeneous antennas in the transmission antenna array 100 and the reception antenna array 200 for the effect of offsetting the magnetic field.

The transmission antenna array 100 and the reception antenna array 200 may be selectively provided as a circular antenna, a quadrupole antenna, an octupole antenna, or any one of heterogeneous antennas, and types and arrangements of antennas illustrated in the drawings are not limited thereto.

Figure 6:
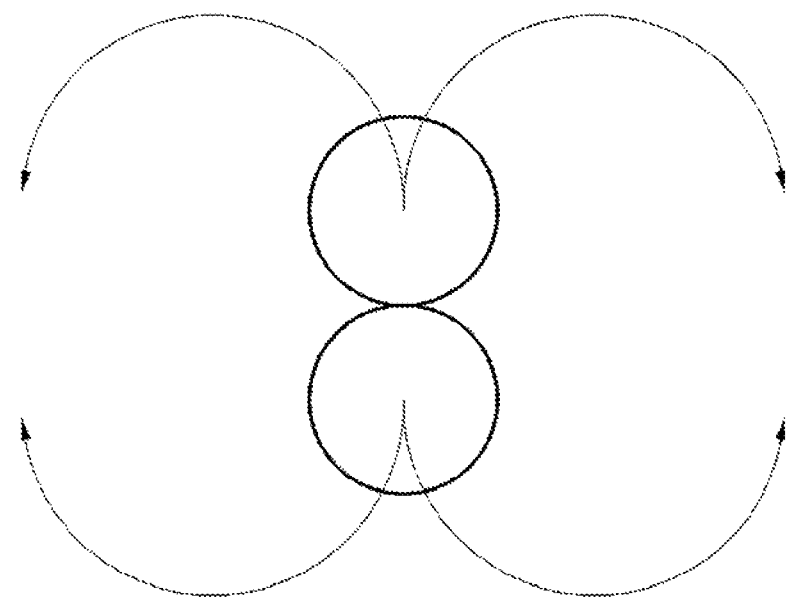
FIG. 6 is a diagram illustrating a bidirectional offset of a short-range magnetic field system according to an embodiment.
Figure 7:
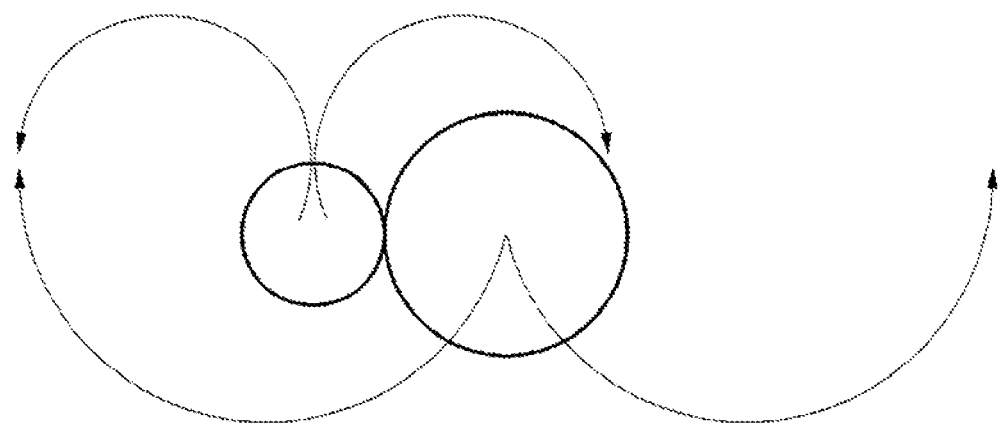
FIG. 7 is a diagram illustrating a unidirectional offset of a short-range magnetic field system according to an embodiment.

FIG. 6 is a diagram illustrating a bidirectional offset of a short-range magnetic field system according to an embodiment, and FIG. 7 is a diagram illustrating a unidirectional offset of a short-range magnetic field system according to an embodiment.

Referring to FIG. 6, when a transmission antenna or a reception antenna is provided as a homogeneous quadrupole antenna, a line of magnetic force may be formed from a first portion of the homogeneous quadrupole antenna in a horizontal direction and a line of magnetic force may be formed from a second portion of the homogeneous quadrupole antenna in the horizontal direction.

Here, two lines of magnetic force may be formed from the first portion of the homogeneous quadrupole antenna, and two lines of magnetic three may be formed from the second portion of the homogeneous quadrupole antenna.

Sizes of the two lines of magnetic force formed from the first portion of the homogeneous quadrupole antenna may be identical, but directions of the two hues of magnetic force formed from the second portion of the homogeneous quadrupole antenna may be opposite.

In addition, the sizes of the two lines of magnetic force formed from the first portion and the second portion of the homogeneous quadrupole antenna may be identical, but the directions of the lines of magnetic force may be opposite on a left side of the homogeneous quadrupole antenna. The sizes of the two lines of magnetic force formed from the first portion and the second portion of the homogeneous quadrupole antenna may be identical, but the directions of the lines of magnetic force may be opposite on a right side of the homogeneous quadrupole antenna.

Thus, because the lines of magnetic force are symmetrically formed on each of the first portion and the second portion in a vertical direction and a horizontal direction, a magnetic field may be bidirectionally offset.

Referring to FIG. 7, a transmission antenna array or a reception antenna is provided as a heterogeneous quadrupole antenna of which a first portion and a second portion are horizontally disposed. Diameters of the first portion and the second portion of the heterogeneous quadrupole antenna may be different.

Here, sizes of two lines of magnetic force formed from the first portion of the heterogeneous quadrupole antenna may be identical, but directions of two lines of magnetic force formed from the first portion of the heterogeneous quadrupole antenna may be opposite. Sizes of two lines of magnetic force formed from the second portion of the heterogeneous quadrupole antenna may be identical, but directions of two lines of magnetic force formed from the second portion of the heterogeneous quadrupole antenna may be opposite.

Although the lines of magnetic force formed from the first portion and the second portion are offset on a left side of the heterogeneous quadrupole antenna, the lines of magnetic force formed from the first portion and the second portion are not offset on a right side of the heterogeneous quadrupole antenna.

The lines of magnetic force may be symmetrically formed on each of the first portion and the second portion of the heterogeneous quadrupole antenna only in a horizontal direction, and the lines of magnetic force may be offset only on the left side of the heterogeneous quadrupole antenna. Thus, the magnetic field may be unidirectionally offset.

As illustrated in FIGS. 6 and 7, the magnetic field in the short-range magnetic field system may be unidirectionally or bidirectionally offset.

Hereinafter, a general antenna disposition to achieve an offset in the short-range magnetic field system will be described.

Figure 8A:
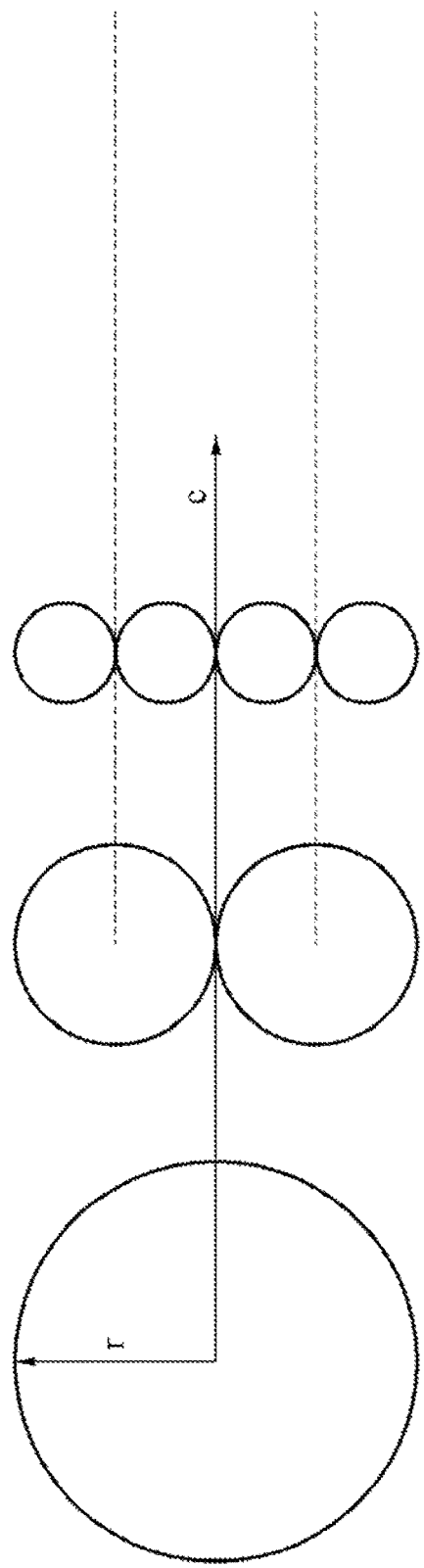
FIGS. 8A and 8B are diagrams illustrating antenna arrangements in a symmetrical horizontal structure in which an offset occurs in a short-range magnetic field system according to an embodiment.
Figure 9:
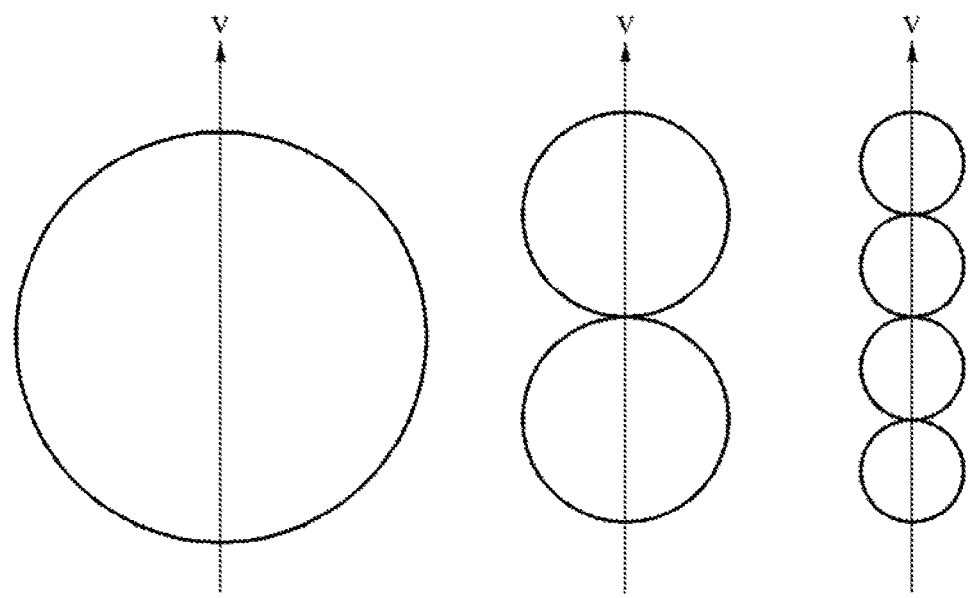
FIG. 9 is a diagram illustrating an antenna arrangement in a symmetrical vertical structure in which an offset occurs in a short-range magnetic field system according to an embodiment.

FIGS. 8A and 8D are diagrams illustrating, antenna arrangements in a horizontal symmetry structure in which an offset occurs in a short-range magnetic field system according to an embodiment, and FIG. 9 is a diagram illustrating an antenna arrangement in a vertical symmetry structure in which an offset occurs in a short-range magnetic field system according to an embodiment.

Referring to FIGS. 8A and SB, antennas may be arranged in the horizontal symmetry structure in the short-range magnetic field system.

For example, a center of an n-th antenna always passes through a vector C that horizontally passes through a starting point of a first antenna, and the n-th antenna has a symmetry structure based on the vector C.

Referring to FIG. 8A, the first antenna is provided as a circular antenna, a second antenna is provided as a homogeneous quadrupole antenna, and a third antenna is provided as an octupole antenna, and a center of the circular antenna, a center of the homogeneous quadrupole antenna, and a center of the octupole antenna may be disposed on an identical line, for example, on the vector C.

Further, a center of a first portion of the homogeneous quadrupole antenna and a center of it first portion and a second portion of the octupole antenna are disposed on the identical line. A center of a second portion of the homogeneous quadrupole antenna and a center of a third portion and a fourth portion of the octupole antenna may be disposed on the identical line.

Also, a radius r of the circular antenna is twice as radius of the first portion of the homogeneous quadrupole antenna, and four times as radius of the first portion of the quadrupole antenna.

In inure detail, when a first transmission antenna is provided as the circular antenna, a second transmission antenna is provided as the homogeneous quadrupole antenna, and a third transmission antenna is provided as the octupole antenna, centers of each of the first transmission antenna, the second transmission antenna, and the third transmission antenna may be disposed in the vertical symmetry structure.

Similarly, when a first reception antenna is provided as the circular antenna, a second reception antenna is provided as the homogeneous quadrupole antenna, and a third reception antenna is provided as the octupole antenna, centers of each of the first reception antenna, the second reception antenna, and the third reception antenna may be disposed in the horizontal symmetry structure.

Figure 8B:
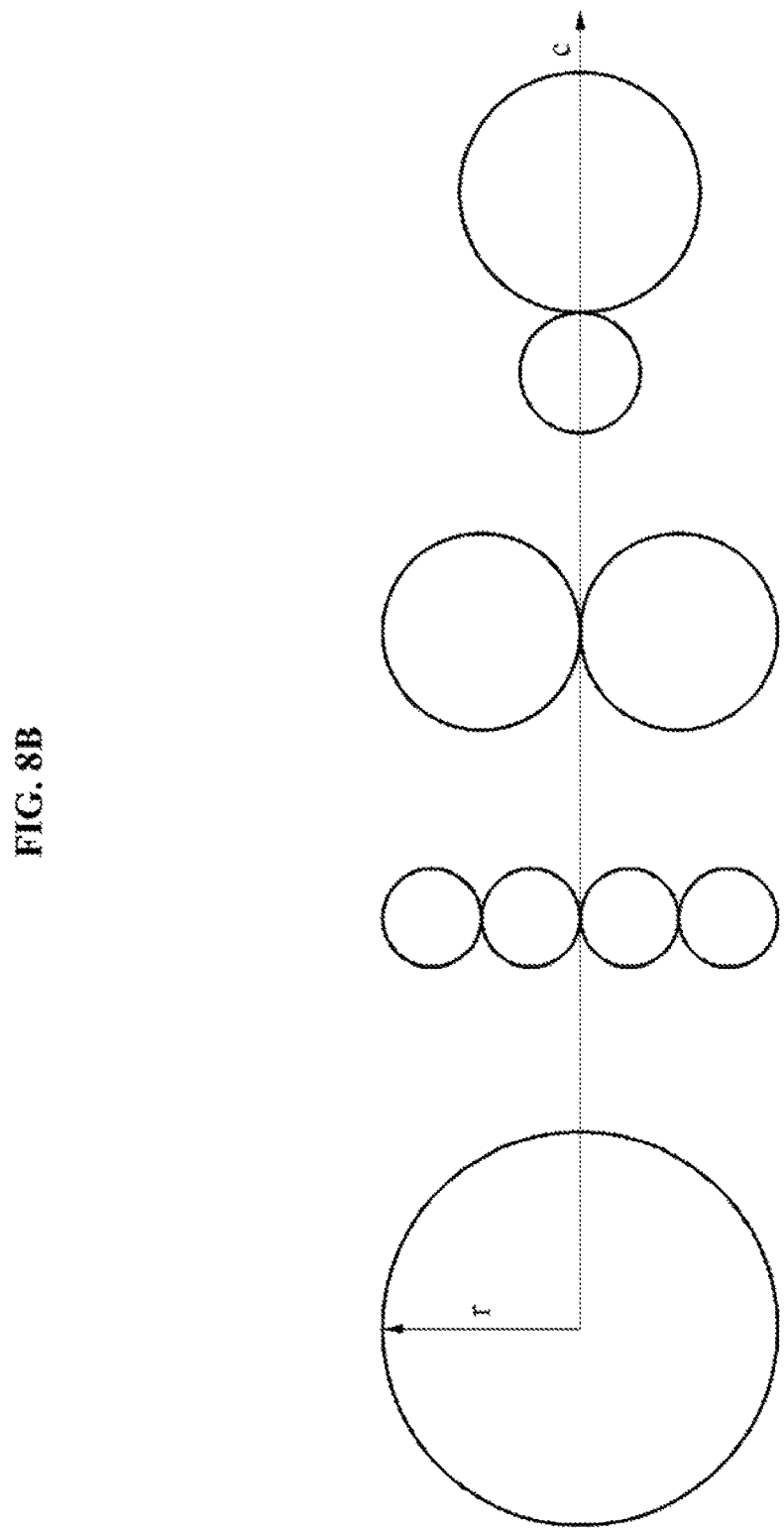

Also, referring to FIG. 8B, when a first antenna is provided as the circular antenna, a second antenna is provided as the octupole antenna, a third antenna is provided as the homogenous quadrupole antenna, and a fourth antenna is provided as the heterogeneous quadrupole antenna, a center of the circular antenna, a center of the octupole antenna, a center of the homogeneous quadrupole antenna, and a center of the heterogeneous quadrupole antenna may be disposed on an identical line, for example, on a vector C.

In more detail, when a first transmission antenna is provided as the circular antenna, a second transmission antenna is provided as the octupole antenna, a third transmission antenna is provided as the homogenous quadrupole antenna, and a fourth transmission antenna is provided as the heterogeneous quadrupole antenna, centers of each of the first transmission antenna, the second transmission antenna a the third transmission antenna, and the fourth transmission antenna may be disposed in the horizontal symmetry structure.

Similarly, when a first reception antenna is provided as the circular antenna, a reception transmission antenna is provided as the octupole antenna, a third reception antenna is provided as the homogenous quadrupole antenna, and a fourth reception antenna is provided as the heterogeneous quadrupole antenna, centers of each of the first reception antenna, the second reception antenna, the third reception antenna, and the fourth reception antenna may be disposed in the horizontal symmetry structure.

Thus, a transmission antenna array or a reception antenna array is provided as at least two pairs of heterogeneous antennas, and thereby an effect of offsetting in the transmission antenna array and the reception antenna array may be obtained.

Referring to FIG. 9, an antenna is provided in a vertical symmetry structure in the short-range magnetic field system.

For example, an n-th antenna is provided in a symmetry structure based on a vertical vector V that passes through a center of the n-th antenna.

In detail, when a first antenna is provided as the circular antenna, the circular antenna is symmetrically disposed based on the vertical vector V. When a second antenna is provided as the homogeneous quadrupole antenna, the homogeneous quadrupole antenna is symmetrically disposed based on the vertical vector V. When a third antenna is provided as the octupole antenna, the octupole antenna is symmetrically disposed based on the vertical vector V.

Here, each vertical vector V that passes through each of the circular antenna, the homogeneous quadrupole antenna, and the octupole antenna may be disposed to be spaced apart from each other in parallel.

Figure 10:
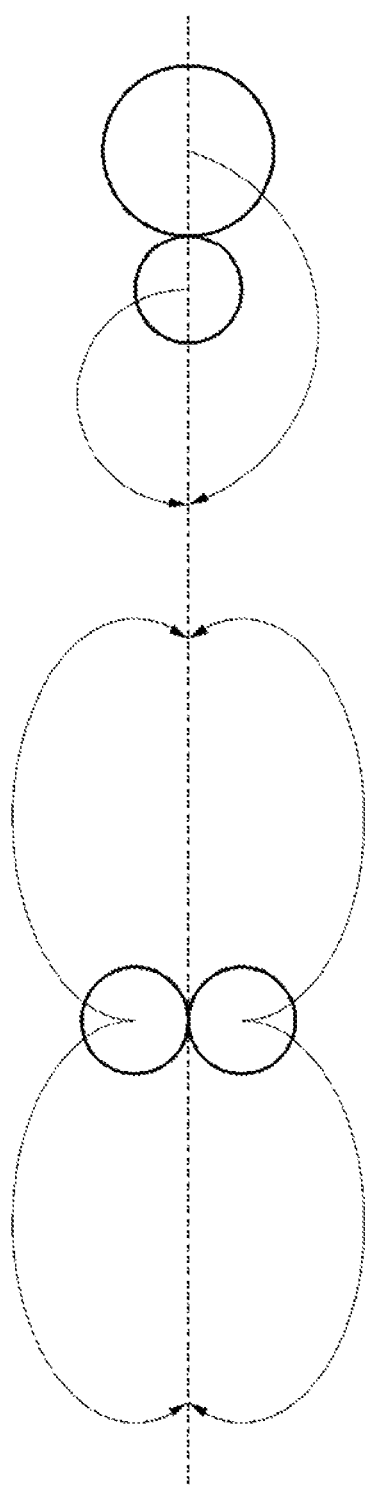
FIG. 10 is a diagram illustrating a range of an effect of offsetting and a reference of an offset in a short-range magnetic field system according to an embodiment.

Referring to FIG. 10, an antenna may include loops having lines of magnetic force of which directions are opposite and sizes are identical.

Here, numbers of loops that form the lines of magnetic force of which the directions are opposite are identical.

For example, when a number of loops that form a line of magnetic force in a direction of +Z is two, a number of loops that form a line of magnetic force in a direction of −Z is two.

Although a direction of Z is not illustrated in detail, the direction of Z may be vertically formed relative to a dotted line.

For example, when a bidirectional offset occurs, a total sum of lines of magnetic force may be 0 where the lines are at a same distance in a direction in which the offset is possible.

However, when a unidirectional offset occurs, die total sum of the lines of magnetic force may be 0 when the lines are at the same distance in the direction in which the offset is possible, but the total sum of the lines of magnetic force may not be 0 when the lines are at the same distance in a direction in which the offset is impossible.

Figure 11:
FIG. 11 is a diagram illustrating a signal being separate from a transmitter in a short-range magnetic field system according to an embodiment.

FIG. 11 is a diagram illustrating a signal being separate from a transmitter in a short-range magnetic field system according to an embodiment.

Referring to FIG. 11, when two transmission antennas and two reception antennas are provided in the short-range magnetic field system, a signal may exist only in series.

Because the signal is initially separate from the two transmission antennas, additional channel estimation may not be required. The channel estimation is performed to separate a combined signal when the signal exists in a diagonal direction.

Also, the short-range magnetic field system having a multiple input multiple output (MIMO) structure may increase a data transmitting rate when data is transmitted using an identical amount of power, maintain the data transmitting rate even when the amount of power is decreased, and reduce an error rate when identical pieces of data are simultaneously transmitted, thereby enhancing a reliability of the short-range magnetic field system.

Similarly, the short-range magnetic field system may dispose heterogeneous antennas in a MIMO system and thus, each of MIMO structure transmission ends or each of MIMO structure reception ends may be uninfluenced by each other because a signal is separate due to an effect of offsetting of the heterogeneous antennas, and a complexity of the short-range magnetic field system may be reduced because signals of a transmission end are separated from each other and channel estimation required for a related electromagnetic wave based MIMO system is unnecessary, and the short-range magnetic field system may be applied to underwater communication, underground communication, and a human implantable apparatus because the system is uninfluenced by permittivity of a medium. In addition, the short-range magnetic field system may be applied to short-range communication and military applications that require security because electromagnetic wave jamming or signal wiretapping is impossible. The short-range magnetic field system may be also applied to a wireless power transmitting for transportation because communication and wireless power transmission are simultaneously performed such that information required for transportation, for example, information on roads, may be transmitted in real time.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A short-range magnetic field system, the system comprising:
    a transmission antenna array disposed on a transmission end; and
    a reception antenna array disposed on a reception end such that the reception antenna array faces the transmission antenna array,
    wherein a magnetic field formed around the transmission antenna array or the reception antenna array is offsettable,
    wherein the transmission antenna array comprises a plurality of transmission antennas, the transmission antennas comprise heterogeneous antennas each having an effect of offsetting a magnetic field,
    wherein centers of the plurality of transmission antennas are disposed on an identical line, and each of the plurality of transmission antennas is symmetrically disposed relative to the identical line, such that sizes of lines of magnetic force formed between the plurality of transmission antennas are identical, and directions of the lines of magnetic force are opposite.

2. The system of claim 1, wherein a signal transmitted from the transmission antenna array is incoherently received by the reception antenna array.

3. The system of claim 1, wherein the reception antenna array comprises a plurality of reception antennas.

4. The system of claim 3, wherein the reception antennas comprise heterogeneous antennas each having an effect of offsetting a magnetic field, and the heterogeneous antennas comprise a circular antenna or a multipolar antenna.

5. The system of claim 4, wherein the multipolar antenna comprises a quadrupole antenna, and the quadrupole antenna comprises a homogeneous quadrupole antenna having two loops identical in diameter and a heterogeneous quadrupole antenna having two loops different in diameter.

6. The system of claim 5, wherein the two loops of the heterogeneous quadrupole antenna are disposed in a vertical direction of the two loops of the homogeneous quadrupole antenna.

7. The system of claim 6, wherein the transmission antennas or the reception antennas comprise the homogeneous quadrupole antenna and the heterogeneous quadrupole antenna, and a diameter of a near loop of the heterogeneous quadrupole antenna relative to the homogeneous quadrupole antenna is less than a diameter of a distant loop of the heterogeneous quadrupole antenna relative to the homogeneous quadrupole antenna.

8. The system of claim 4, wherein the multipolar antenna further comprises an octupole antenna, and the octupole antenna has a plurality of loops identical in diameter.

9. The system of claim 4, wherein the circular antenna or the multipolar antenna has a coil, and a number of turns of the coil is adjustable.

10. The system of claim 3, wherein centers of the reception antennas are disposed on an identical line, and each of the reception antennas is symmetrically disposed relative to the identical line.

11. The system of claim 3, wherein the transmission antennas or the reception antennas are disposed to be spaced apart from each other in parallel.

* * * * *